United States Patent
Miki et al.

(10) Patent No.: US 8,324,875 B2
(45) Date of Patent: Dec. 4, 2012

(54) MULTIPHASE DC/DC CONVERTER WITH OUTPUT PHASES DEVIATED FROM OR ALIGNED WITH EACH OTHER AND DRIVEN WITH FIXED ON TIME

(75) Inventors: Tomoyuki Miki, Kyoto (JP); Koji Nishikawa, Kyoto (JP); Keisuke Kadowaki, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 282 days.

(21) Appl. No.: 12/608,084

(22) Filed: Oct. 29, 2009

(65) Prior Publication Data

US 2010/0109622 A1 May 6, 2010

(30) Foreign Application Priority Data

| Oct. 30, 2008 | (JP) | 2008-279574 |
| Nov. 6, 2008 | (JP) | 2008-284994 |
| Nov. 12, 2008 | (JP) | 2008-289393 |

(51) Int. Cl.
*G05F 1/577* (2006.01)
*G05F 1/00* (2006.01)

(52) U.S. Cl. ......... 323/272; 323/283; 323/284; 323/285

(58) Field of Classification Search .................. 323/225, 323/271, 272, 284, 285, 283
See application file for complete search history.

(56) References Cited

U.S. PATENT DOCUMENTS

| 6,628,106 B1* | 9/2003 | Batarseh et al. ............. 323/222 |
| 7,456,618 B2* | 11/2008 | Jain et al. ...................... 323/272 |
| 7,489,117 B2* | 2/2009 | Jain .............................. 323/224 |
| 7,504,812 B2* | 3/2009 | Riehl ............................ 323/283 |
| 2007/0076454 A1 | 4/2007 | Burstein et al. |

FOREIGN PATENT DOCUMENTS

| JP | 2003-284333 | 10/2003 |
| JP | 2007-116834 | 5/2007 |

* cited by examiner

*Primary Examiner* — Matthew Nguyen
*Assistant Examiner* — Zekre Tsehaye
(74) *Attorney, Agent, or Firm* — Fish & Richardson P.C.

(57) ABSTRACT

A multiphase DC/DC converter according to the present invention includes: a plurality of DC/DC converters whose outputs are connected in common to supply electric power to a load; a load state detection portion which detects a state of the load connected to the plurality of DC/DC converters and outputs a detection result; and a control circuit which drives each of the plurality of DC/DC converters based on outputs from the plurality of DC/DC converters, and based on an output from the load state detection portion, drives the plurality of DC/DC converters with output phases of the plurality of DC/DC converters deviated from each other or with the output phases of the plurality of DC/DC converters aligned with each other.

4 Claims, 15 Drawing Sheets

LIMITED TO THE MAXIMUM DUTY 50%

MULTIPHASE DC/DC CONVERTER WITH OUTPUT PHASES DEVIATED FROM OR ALIGNED WITH EACH OTHER AND DRIVEN WITH FIXED ON TIME

This application is based on the following Japanese Patent Applications:

[1] No. 2008-279574 (the filing date: Oct. 30, 2008)
[2] No. 2008-284994 (the filing date: Nov. 6, 2008)
[3] No. 2008-289393 (the filing date: Nov. 12, 2008), the contents of which are hereby incorporated by reference.

BACKGROUND OF THE INVENTION

1. Field of the Invention

The present invention relates to a multiphase DC/DC converter.

2. Description of Related Art

Conventionally, a multiphase DC/DC converter is known, in which a plurality of DC/DC converter circuits that are connected in parallel with each other are driven with the output phases deviated from each other and each output is summed up, so that a desired output voltage is generated from an input voltage.

As examples of conventional art related to the above description, there are JP-A-2003-284333 and JP-A-2007-116834 (hereinafter, called patent documents 1 and 2).

Indeed, the above conventional multiphase DC/DC converter is able to output a large electric current to a load compared with a single-phase DC/DC converter; accordingly, it is possible to preferably use the above conventional multiphase DC/DC converter as a power supply for loads (a CPU [Central Processing Unit] and the like) which have a large consumed electric current.

However, as for the multiphase DC/DC converter, there are many issues such as improvement in transient response characteristic, appropriate overvoltage protection operation, stabilization of drive frequency and the like which are to be studied to achieve further improvement in performance. Hereinafter, specific description is performed.

(First Background Art)

FIG. 5 is a circuit block diagram showing a first conventional example of a multiphase DC/DC converter. As shown in the drawing, the multiphase DC/DC converter as the first conventional example is so structured as to include: a plurality of DC/DC converter circuits 100-1 to 100-$m$ (here, $m \geq 2$) which are connected in parallel with each other; and a control circuit 200 which generates drive signals S1 to Sm so as to drive the DC/DC converter circuits 100-1 to 100-$m$ with the output phases of the DC/DC converter circuits 100-1 to 100-$m$ deviated from each other; wherein each output from of the DC/DC converter circuits 100-1 to 100-$m$ is summed up, so that a desired output voltage Vout is generated from an input voltage Vin.

Besides, in the multiphase DC/DC converter as the first conventional example, the control circuit 200 is so structured as to include: a comparator 201 which compares the output voltage Vout and a predetermined reference voltage Vref and outputs a comparison signal; a pulse signal generation portion 202 which by using the comparison signal as a trigger, generates a pulse signal S0 that has a predetermined pulse width; and a pulse distribution portion 203 which successively distributes pulses of the pulse signal S0 to generate the drive signals S1 to Sm; wherein the DC/DC converter circuits 100-1 to 100-$m$ are each driven in an on-time fixed mode.

However, in the multiphase DC/DC converter as the first conventional example, in driving each of the DC/DC converter circuits 100-1 to 100-$m$ in the on-time fixed mode, it is impossible to drive the respective phases at the same time and the on duty of each phase is limited to 100/m (%) even at the utmost or smaller; accordingly, there is a problem that when a sharp increase in the output current Iout occurs, the output voltage Vout drops from a target value.

FIG. 6 is a timing chart to explain the problem with the first conventional example. In FIG. 6, a case of m=2 is described as an example for simple description.

(Second Background Art)

FIG. 10 is a circuit block diagram showing a second conventional example of the multiphase DC/DC converter. As shown in the drawing, the multiphase DC/DC converter as the second conventional example is so structured as to include: the plurality of DC/DC converter circuits 100-1 to 100-$m$ (here, $m \geq 2$) which are connected in parallel with each other; and the control circuit 200 which generates the drive signals S1 to Sm so as to drive the DC/DC converter circuits 100-1 to 100-$m$ with the output phases of the DC/DC converter circuits 100-1 to 100-$m$ deviated from each other; wherein each output from of the DC/DC converter circuits 100-1 to 100-$m$ is summed up, so that the desired output voltage Vout is generated from the input voltage Vin.

Besides, the control circuit 200 has a structure in which based on a phase control signal PHASE input from outside, the control circuit 200 is able to arbitrarily set the number x (here, $1 \leq x \leq m$) of drive phases, that is, the drive-phase number, of the DC/DC converter circuits 100-1 to 100-$m$. In a case where the drive-phase number x of the DC/DC converter circuits 100-1 to 100-$m$ is set smaller than the maximum value, both transistors NHy and NLy of a DC/DC converter circuit 100-$y$ (here, $(x+1) \leq y \leq m$) other than the DC/DC converter circuits having the drive phase are turned off and the output terminal is brought into a high-impedance state.

When an overvoltage in the output voltage Vout is detected by an overvoltage detection circuit 300, the control circuit 200 has a structure in which the control circuit 200 stops the switching operation of the transistors NHx, NLx of the DC/DC converter circuit 100-$x$ having the drive phase and turns on the transistor NLx on a low side; thus, the output voltage Vout is pulled down to a ground potential. According to such structure, even when an overvoltage in the output voltage Vout is detected, it is possible to protect circuit elements and the load by performing the above overvoltage protection operation.

However, in the multiphase DC/DC converter as the second conventional example, in a case where the drive-phase number x of the DC/DC converter circuits 100-1 to 100-$m$ is set smaller than the maximum value, the transistor NLy on the low side of the DC/DC converter circuit 100-$y$ other than the DC/DC converter circuits having the drive phase is normally kept in an off state regardless of detection of an overvoltage in the output voltage Vout; accordingly, there is a problem that the speed at which the output voltage Vout is pulled down to a ground potential is slow compared with the time of all-phase driving.

FIG. 11 is a timing chart to explain the problem with the second conventional example and represents in order from the top: the output voltage Vout; an overvoltage detection signal OVP; a gate signal of the transistor NL1; a gate signal of the transistor NL2; and gate signals of the transistors NL3 to NLm. In FIG. 11, it is assumed that the drive-phase number x is set at 2.

As shown in FIG. 11, in the time of 2-phase driving, when an overvoltage in the output voltage Vout is detected, the switching operations of the DC/DC converters 100-1, 100-2 having the drive phase are stopped and the transistors NL1, NL2 on the low sides are turned on. On the other hand, in the DC/DC converters 100-3 to 100-m other than the DC/DC converters having the drive phase, the transistors NL3 to NLm on the low sides are normally kept in the off state regardless of occurrence of an overevoltage in the output voltage Vout.

Specifically, in the multiphase DC/DC converter as the second conventional example, because a discharge route via the transistors NL3 to NLm is never used, the speed at which the output voltage Vout is pulled down to the ground potential becomes slow compared with the time of the all-phase driving.

(Third Background Art)

FIG. 14 is a circuit block diagram showing a third conventional example of the multiphase DC/DC converter. As shown in the drawing, the multiphase DC/DC converter as the third conventional example is so structured as to include: the plurality of DC/DC converter circuits 100-1 to 100-m (here, m≧2) which are connected in parallel with each other; and the control circuit 200 which generates the drive signals S1 to Sm so as to drive the DC/DC converter circuits 100-1 to 100-m with the output phases of the DC/DC converter circuits 100-1 to 100-m deviated from each other; wherein each output from of the DC/DC converter circuits 100-1 to 100-m is summed up, so that the desired output voltage Vout is generated from the input voltage Vin.

Besides, the multiphase DC/DC converter as the third conventional example has a structure in which based on the phase control signal PHASE input from outside, the multiphase DC/DC converter is able to arbitrarily set the drive-phase number of the DC/DC converter circuits 100-1 to 100-m.

However, in the multiphase DC/DC converter as the third conventional example, the frequencies of the drive signals S1 to Sm are normally fixed at constant values regardless of the drive-phase number of the DC/DC converter circuits 100-1 to 100-m. Accordingly, the drive frequency of the entire multiphase DC/DC converter dramatically changes in accordance with the drive-phase number of the DC/DC converter circuits 100-1 to 100-m, which makes it to difficult to take measurers against noise.

FIG. 15 is a timing chart to explain the problem with the third conventional example. In FIG. 15, for simple description, only comparison among the drive signal S1 in the time of the 1-phase driving, the drive signals S1, S2 and a sum signal S1+S2 (which corresponds to a drive signal in a case where a single DC/DC converter circuit is assumed) of the drive signals S1 and S2 is performed.

As shown in FIG. 15, when it is assumed that the drive signals S1, S2 have a period of T, and there is a phase difference of 180° (which is equivalent to T/2) between the drive signals S1 and S2 in the time of the 2-phase diving, it is understood that the drive frequency of the entire multiphase DC/DC converter dramatically changes from a frequency f=1/T (the frequency of the drive signal S1) to a frequency of 2×f (the frequency of the sum signal S1+S2) between the time of the 1-phase driving and the time of the 2-phase driving.

SUMMARY OF THE INVENTION

The present invention has been made to deal with the conventional problems, and it is an object to achieve further improvement in performance.

To achieve the above object, a multiphase DC/DC converter according to the present invention includes: a plurality of DC/DC converters whose outputs are connected in common to supply electric power to a load; a load state detection portion which detects a state of the load connected to the plurality of DC/DC converters and outputs a detection result; and a control circuit which drives each of the plurality of DC/DC converters based on outputs from the plurality of DC/DC converters, and based on an output from the load state detection portion, drives the plurality of DC/DC converters with output phases of the plurality of DC/DC converters deviated from each other or with the output phases of the plurality of DC/DC converters aligned with each other.

Other features, elements, steps, advantages, and characteristics of the present invention will be more apparent from detailed description of the following best embodiments and accompanying drawings in connection with the embodiments.

DETAILED DESCRIPTION OF PREFERRED EMBODIMENTS (First Embodiment)

Figure 1:
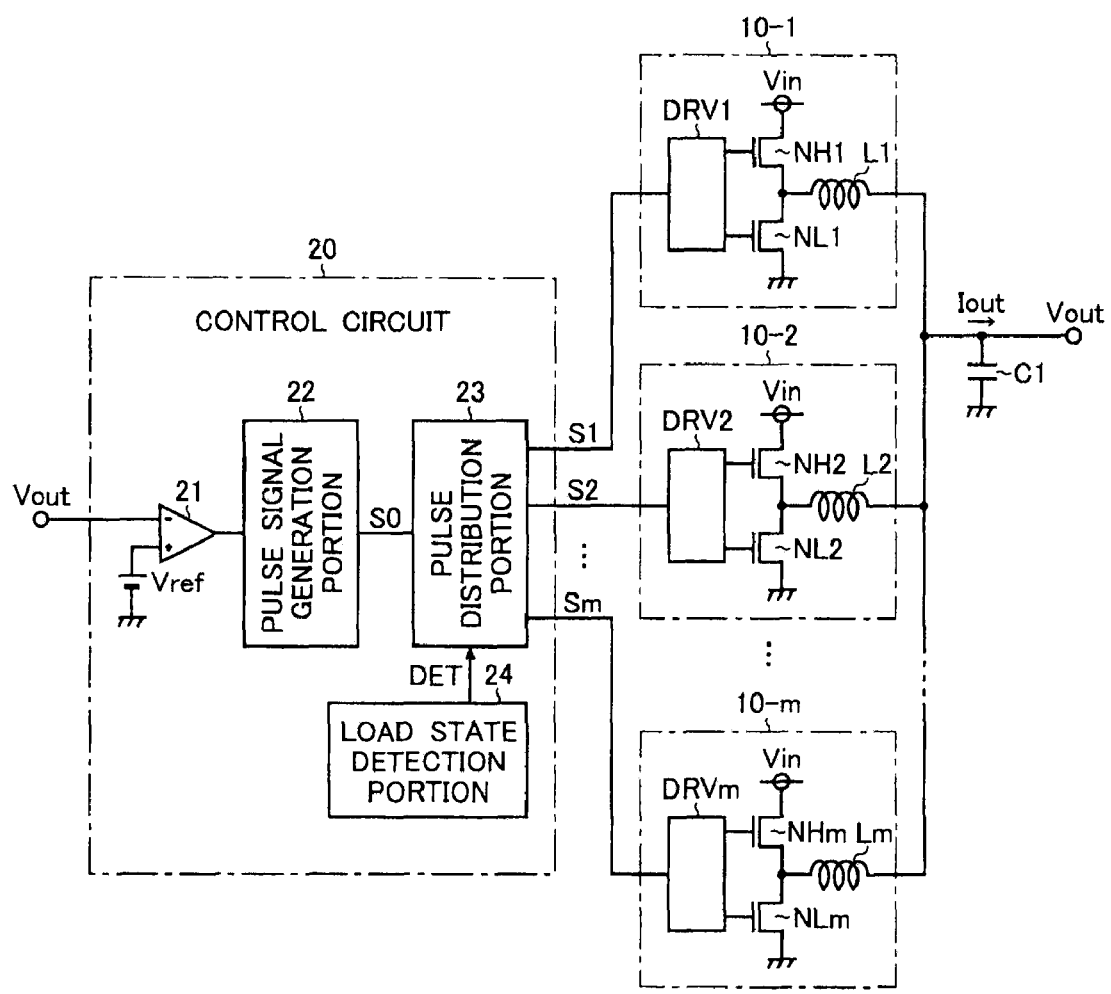
FIG. 1 is a block diagram showing a first embodiment of a multiphase DC/DC converter according to the present invention.

FIG. 1 is a block diagram showing a first embodiment of a multiphase DC/DC converter according to the present invention. As shown in FIG. 1, the multiphase DC/DC converter according to the present embodiment is so structured as to include: a plurality of DC/DC converter circuits 10-1 to 10-m (here, m≧2) which are connected in parallel with each other; and a control circuit 20 which drives separately the DC/DC converter circuits 10-1 to 10-m in an on-time fixed mode; wherein each output from of the DC/DC converter circuits 10-1 to 10-*m* is summed up, so that a desired output voltage Vout is generated from an input voltage Vin.

A DC/DC converter circuit 10-*k* (here, $1 \leq k \leq m$) includes: N-channel type MOS field effect transistors NHk, NLk; an inductor Lk; and a driver DRVk. The transistors NHk, NLk are connected in series between an application terminal of the input voltage Vin and a ground terminal and their connection nodes are connected to one terminal of the inductor Lk. The other terminal of the inductor Lk is connected to an output terminal of the output voltage Vout. A capacitor C1 is connected between the output terminal of the output voltage Vout and the ground terminal. Gates of the transistors NHk, NLk are each connected to a gate signal output terminal of the driver DRVk.

The driver DRVk generates separately gate signals of the transistors NHk, NLk based on a drive signal Sk input from the control circuit 20. Specific description of the present embodiment is performed. When the drive signal Sk is on a high level, the driver DRVk generates separately the gate signals of the transistors NHk, NLk to turn on the transistor NHk on a high side and to turn off the transistor NLk on a low side, while when the drive signal Sk is on a low level, the driver DRVk generates separately the gate signals of the transistors NHk, NLk to turn off the transistor NHk on the high side and to turn on the transistor NLk on the low side. Here, the relation between the logic level of the drive signal Sk and the on/off states of the transistors NHk, NLk is only an example and an inverse relation may be used.

On the other hand, the control circuit 20 includes: a comparator 21; a pulse signal generation portion 22; a pulse distribution portion 23; and a load state detection portion 24.

The comparator 21 compares the output voltage Vout (here, a divided voltage of the output voltage Vout is also included) input into an inverting input terminal (−) and the predetermined reference voltage Vref input into a non-inverting terminal (+) and outputs a comparison signal. Specifically, the logic level of the comparison signal goes to a low level when the output voltage Vout is higher than the reference voltage Vref while goes to a high level when the output voltage Vout is lower than the reference voltage Vref.

By using a rising edge of the comparison signal as a trigger, the pulse signal generation portion 22 generates a pulse signal S0 which has a predetermined pulse width.

The pulse distribution portion 23 successively distributes pulses of the pulse signal S0 to generate the drive signals S1 to Sm. During the time the drive signal Sk (here, $1 \leq k \leq m$) is held at the high level for a predetermined on time after the output voltage Vout becomes lower than the reference voltage Vref, in the DC/DC converter circuit 10-*k*, the transistor NHk on the high side is turned on and the transistor NLk on the low side is turned off; accordingly, the output voltage Vout rises. Then, when the drive signal Sk is returned to the low level, in the DC/DC converter circuit 10-*k*, the transistor NHk on the high side is tuned off and the transistor NLk on the low side is turned on; accordingly, the output voltage Vout gradually drops. Thereafter, every time the output voltage Vout becomes lower than the reference voltage Vref, the above operation is repeated with the drive phases being switched successively.

The load state detection portion 24 detects a state of the load (not shown in FIG. 1) which receives electric power from the DC/DC converter circuits 10-1 to 10-*m* and, based on the detection result, switches operations for driving the DC/DC converter circuits 10-1 to 10-*m* with the output phases of the DC/DC converter circuits 10-1 to 10-*m* deviated from each other or aligned with each other. Specific description of the present embodiment is performed. The load state detection portion 24 has a structure in which the load state detection portion 24 generates a load state detection signal DET for controlling the pulse distribution process of the pulse distribution portion 23 and transmits the load state detection signal DET to the pulse distribution portion 23. Here, the load state detection signal DET is a binary signal which is bought to a high level in a case where a rapid change in the load is detected and brought to a low level in other cases.

Figure 2:
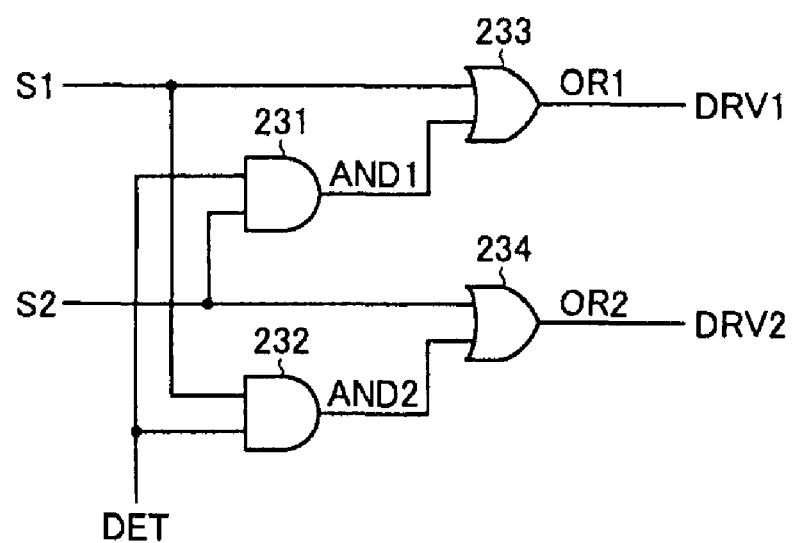
FIG. 2 is a diagram showing an example of an output stage of a pulse distribution portion 23.

FIG. 2 is a diagram showing an example of an output stage of the pulse distribution portion 23. Here, in FIG. 2, for simple description, a structure in which only two-system drive signals S1, S2 are output is represented as an example. As shown in FIG. 2, the pulse distribution portion 23 having the structural example includes logical-multiply operation circuits 231, 232 and logical-sum operation circuits 233, 234 as circuit elements which form the output stage.

The logical-multiply operation circuit 231 outputs a logical-multiply operation signal AND1 of the load state detection signal DET and the drive signal S2. The logical-multiply operation circuit 232 outputs a logical-multiply operation signal AND2 of the load state detection signal DET and the drive signal S1. The logical-sum operation circuit 233 outputs a logical-sum operation signal OR1 of the drive signal S1 and the logical-multiply operation signal AND1 to a driver DRV1. The logical-sum operation circuit 234 outputs a logical-sum operation signal OR2 of the drive signal S2 and the logical-multiply operation signal AND2 to a driver DRV2.

In the output stage of the pulse distribution portion 23 having the above structure, when the load state detection signal DET is on the low level, both logical-multiply operation signals AND1, AND 2 go to the low level regardless of the drive signals S1, S2; accordingly, the logical-sum operation signals OR1, OR2 are respectively equal to the drive signals S1, S2 which are through-output, that is, output through the logical-sum operation circuits 233, 234 as they are. On the other hand, when the load state detection signal DET is on the high level, the logical-multiply operation signals AND1, AND 2 are respectively equal to the drive signals S2, S1 which are through-output, that is, output through the logical-multiply operation circuits 231, 232 as they are; accordingly, both logical-sum operation signals OR1, OR2 are equal to a signal (which is a pulse signal S0) that is obtained by adding the drive signals S1, S2 and output.

Specifically, the pulse distribution portion 23 has a structure in which when the load state detection signal DET is on the high level, the pulse distribution portion 23 regenerates the pulse signal S0 from the drive signals S1 to S2 which are generated by successively distributing pulses of the pulse signal S0, and outputs the regenerated pulse signal S0 to the drivers DRV1, DRV2 as the drive signals S1, S2. However, the structure of the present invention is not limited to this: the pulse distribution portion 23 may have a structure in which the pulse distribution portion 23 stops the pulse distribution process itself when the load state detection signal DET is on the high level and through-outputs the pulse signal S0 to the drivers DRV1, DRV2 without applying any process to the pulse signal S0.

Figure 3:
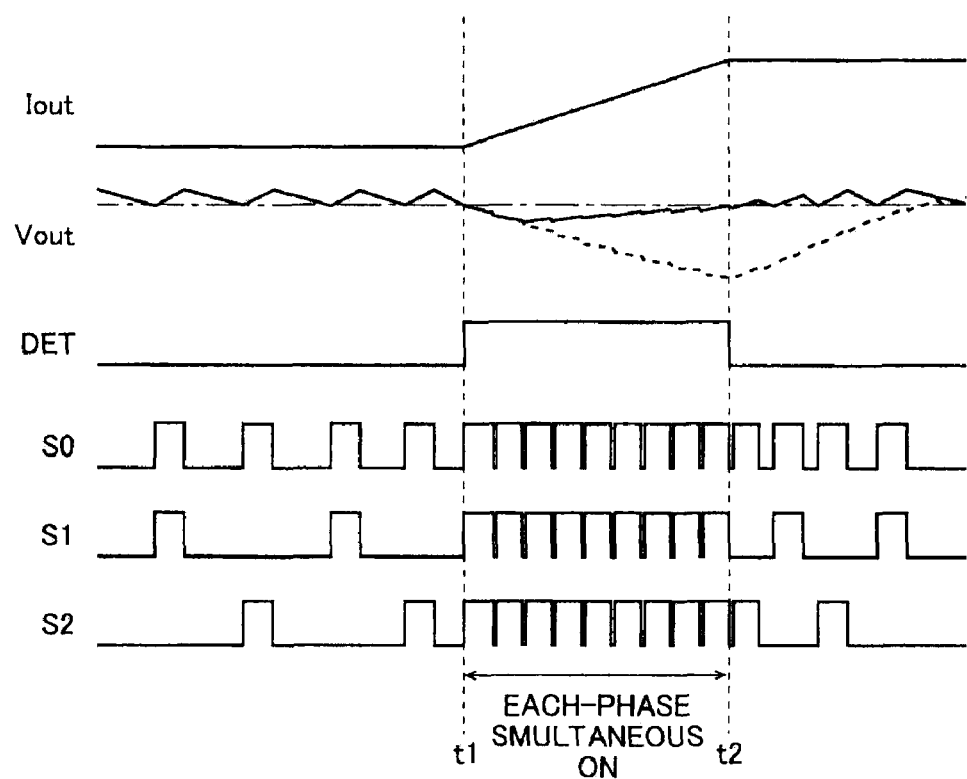
FIG. 3 is a timing chart showing pulse distribution control in accordance with a load state.

FIG. 3 is a timing chart showing an example of pulse distribution control in accordance with a load state and represents, in order from the top, behaviors of: the output current Iout; the output voltage Vout; the load state detection signal DET; the pulse signal S0; and the drive signals S1, S2. Here, in FIG. 3, for simple description, a structure in which only the two-system drive signals S1, S2 are output is represented as an example.

When the output voltage Vout gradually drops and becomes lower than the reference voltage Vref (a one-bar one-dot line in the drawing), the comparison signal (not shown in FIG. 3) from the comparator 21 rises from the low level to the high level. From the rising time of the comparison signal to the time a predetermined time elapses, the pulse signal generation portion 22 raises the pulse signal S0 to the high level and then pulls the pulse signal S0 down to the low level. In other words, in the pulse signal generation portion 22, the pulse signal S0 having a predetermined pulse width is generated with the rising edge of the comparison signal being used as a trigger.

Before a time t1 and after a time t2, a sharp change (a sharp increase in the output current Tout supplied to the load) does not occur and the load state detection signal DET generated by the load state detection portion 24 is held at the low level; accordingly, the pulse distribution portion 23 successively distributes pulses of the pulse signal S0 to the two systems to generate the drive signals S1, S2 and outputs the drive signals S1, S2 to the drivers DRV1, DRV2. As a result of this, the DC/DC converter circuits 10-1 to 10-2 are driven with the output phases deviated from each other.

On the other hand, between the times t1 and t2, as a result of the occurrence of a sharp change in the load, the load state detection signal DET is held at the high level; accordingly, the pulse distribution portion 23, as described above, outputs the pulse signal S0 to the drivers DRV1, DRV2 as the drive signals S1, S2, respectively. As a result of this, the DC/DC converter circuits 10-1 to 10-2 are driven with the output phases aligned with each other.

As described above, according to the structure in which the operations for driving the DC/DC converter circuits 10-1 to 10-m with the output phases of the DC/DC converter circuits 10-1 to 10-m with deviated from each other or aligned with each other are switched depending on a detection result of the load state, it becomes possible to turn on all the transistors NH1 to NHm on the high sides at the same time only at the time of a sharp change in the load; accordingly, it becomes possible to raise the on duty of each phase to 100% (or near) if necessary while performing the drive control in the on-time fixed mode. Accordingly, in the multiphase DC/DC converter according to the present embodiment, it becomes possible to prevent the output voltage Vout from dropping even when a sharp increase in the output current Tout occurs.

Figure 4A:
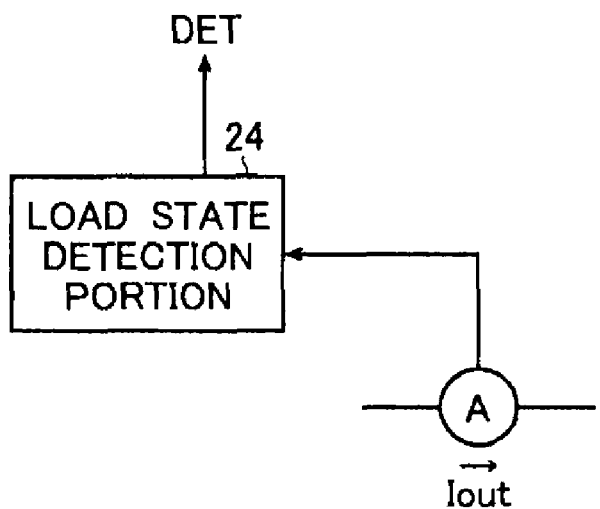
FIG. 4A is a diagram showing a first example of a load state detection technique.

The load state detection portion 24, as shown in FIG. 4A, may have a structure in which the load state detection portion 24 monitors the output current Tout supplied to the load and drives the DC/DC converter circuits 10-1 to 10-m with the output phases of the DC/DC converter circuits 10-1 to 10-m aligned with each other when a sharp increase (the amount of current increase per unit time reaches a predetermined threshold) in the output current Iout is detected.

Figure 4B:
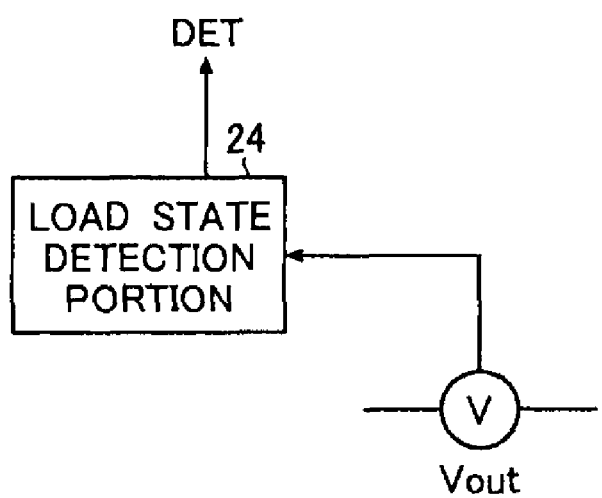
FIG. 4B is a diagram showing a second example of a load state detection technique.

Besides, the load state detection portion 24, as shown in FIG. 4B, may also have a structure in which the load state detection portion 24 monitors the output voltage Vout supplied to the load and drives the DC/DC converter circuits 10-1 to 10-m with the output phases of the DC/DC converter circuits 10-1 to 10-m aligned with each other when a sharp decrease (the amount of voltage decrease per unit time reaches a predetermined threshold) in the output voltage Vout is detected.

According to such structures, it becomes possible to detect a sharp change in the load by itself without requiring a control signal from outside and to perform the above switching control.

Figure 4C:
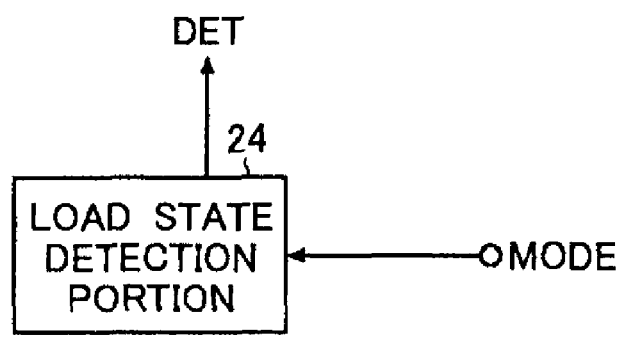
FIG. 4C is a diagram showing a third example of a load state detection technique.
Figure 5:
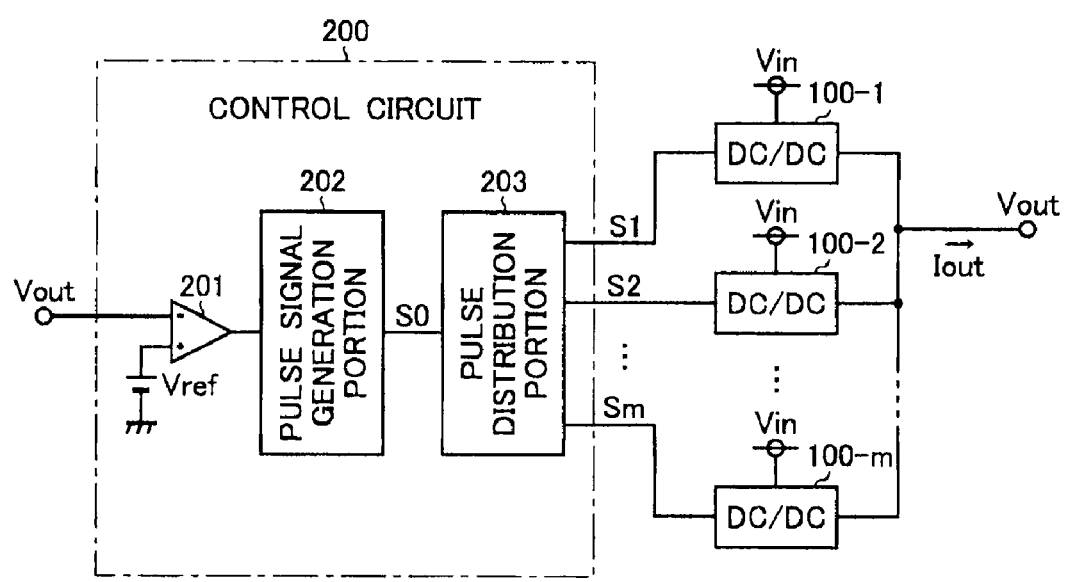
FIG. 5 is a block diagram showing a first conventional example of a multiphase DC/DC converter.
Figure 6:
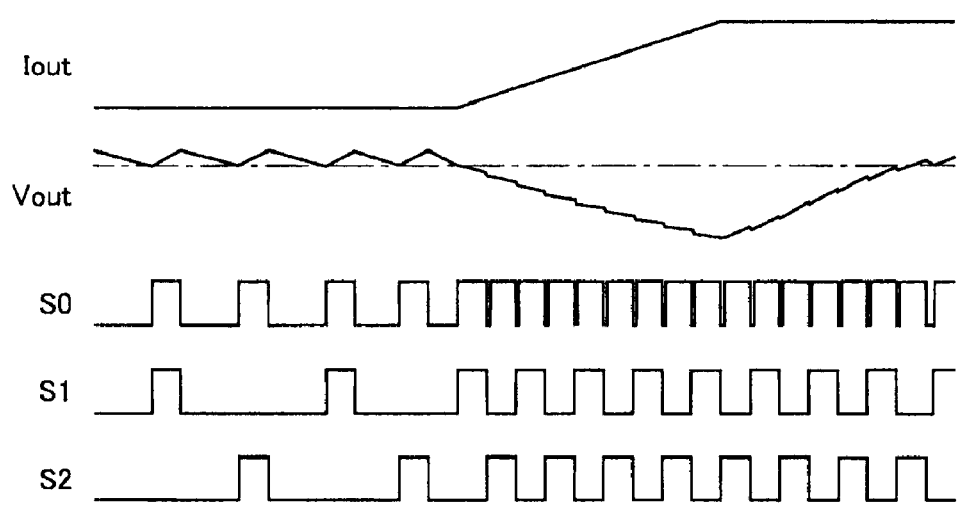
FIG. 6 is a timing chart to explain a problem with the first conventional example.

Besides, the load state detection portion 24, as shown in FIG. 4C, may also have a structure in which the load state detection portion 24 monitors a control signal MODE for switching the operation modes of the load and drives the DC/DC converter circuits 10-1 to 10-m with the output phases of the DC/DC converter circuits 10-1 to 10-m aligned with each other when the load is brought into a heavy-load state (e.g., when a CPU that is the load is switched from a sleep mode to a standby mode).

According to such structure, it becomes possible to perform the above switching control without requiring additional elements such as an ammeter, a voltmeter and the like.

(Second Embodiment)

Figure 7:
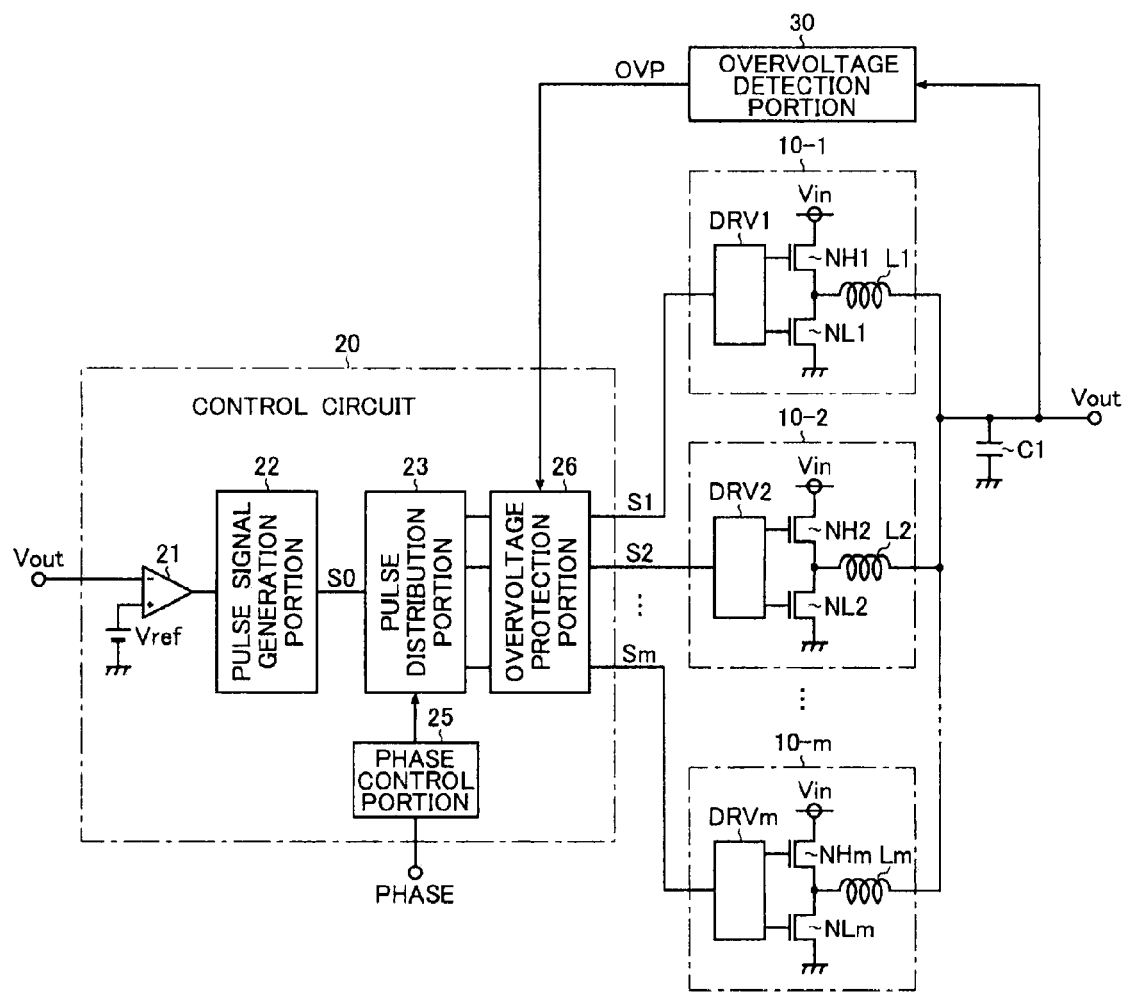
FIG. 7 is a block diagram showing a second embodiment of a multiphase DC/DC converter according to the present invention.

FIG. 7 is a block diagram showing a second embodiment of a multiphase DC/DC converter according to the present invention. As shown in FIG. 7, the multiphase DC/DC converter according to the present embodiment is so structured as to include: the plurality of DC/DC converter circuits 10-1 to 10-m (here, m≧2) which are connected in parallel with each other; the control circuit 20 which drives the DC/DC converter circuits 10-1 to 10-m with the output phases of the DC/DC converter circuits 10-1 to 10-m deviated from each other; and an overvoltage detection circuit 30 (e.g., a comparator which compares the output voltage Vout and a predetermined threshold Vth) which detects an overvoltage in the output voltage Vout and generates an overvoltage detection signal OVP; wherein each output from of the DC/DC converter circuits 10-1 to 10-m is summed up, so that the desired output voltage Vout is generated from the input voltage Vin.

The DC/DC converter circuit 10-$k$ (here, 1≦k≦m) includes: the N-channel type MOS field effect transistors NHk, NLk; the inductor Lk; and the driver DRVk. The transistors NHk, NLk are connected in series between the application terminal of the input voltage Vin and the ground terminal and their connection nodes are connected to one terminal of the inductor Lk. The other terminal of the inductor Lk is connected to the output terminal of the output voltage Vout. The capacitor C1 is connected between the output terminal of the output voltage Vout and the ground terminal. The gates of the transistors NHk, NLk are each connected to the gate signal output terminal of the driver DRVk.

The driver DRVk generates separately the gate signals of the transistors NHk, NLk based on the drive signal Sk input from the control circuit 20. Specific description of the present embodiment is performed. As the above drive signal Sk, two-system signals, that is, a drive signal Sk (H) used for the drive control of the transistor NHk and a drive signal Sk (L) used for the drive control of the transistor NLk are input into the driver DRVk. When the drive signal Sk (H) is on a high level, the driver DRVk generates the gate signal of the transistor NHk so as to turn on the transistor NHk, while when the drive signal Sk (H) is on a low level, the driver DRVk generates the gate signal of the transistor NHk so as to turn off the transistor NHk. Likewise, when the drive signal Sk (L) is on a high level, the driver DRVk generates the gate signal of the transistor NLk so as to turn on the transistor NLk, while when the drive signal Sk (L) is on a low level, the driver DRVk generates the gate signal of the transistor NLk so as to turn off the transistor NLk. Here, the relation between the logic levels of the drive signals Sk (H), Sk (L) and the on/off states of the transistors NHk, NLk is only an example and an inverse relation may be used.

On the other hand, the control circuit 20 includes: the comparator 21; the pulse signal generation portion 22; the pulse distribution portion 23; a phase control portion 25; and an overvoltage protection portion 26.

The comparator 21 compares the output voltage Vout (here, a divided voltage of the output voltage Vout is also included) input into the inverting input terminal (−) and the predetermined reference voltage Vref input into the non-inverting terminal (+) and outputs the comparison signal. Specifically, the logic level of the comparison signal goes to the low level when the output voltage Vout is higher than the reference voltage Vref while goes to the high level when the output voltage Vout is lower than the reference voltage Vref.

By using the rising edge of the above comparison signal as the trigger, the pulse signal generation portion 22 generates the pulse signal S0 which has the predetermined pulse width.

The pulse distribution portion 23 successively distributes pulses of the pulse signal S0 to generate the drive signals S1 to Sm.

The phase control portion 25 receives an input of the phase control signal PHASE and arbitrarily sets the drive-phase number x of the DC/DC converter circuits 10-1 to 10-m. Specifically, the phase control portion 25 controls the number of distributed pulses, that is, pulse-distribution number, of the pulse signal S0 set by the pulse distribution portion 23 in accordance with the drive-phase number x of the DC/DC converter circuits 10-1 to 10-m.

Based on the overvoltage detection signal OVP input from the overvoltage detection circuit 30, when the overvoltage protection portion 26 determines that an overvoltage in the output voltage Vout is detected, the overvoltage protection portion 26 forcibly turns on the transistors NL1 to NLm on the low sides which form the output stage of each of the DC/DC converter circuits 10-1 to 10-m regardless of the drive-phase number x set by the phase control signal PHASE.

Figure 8:
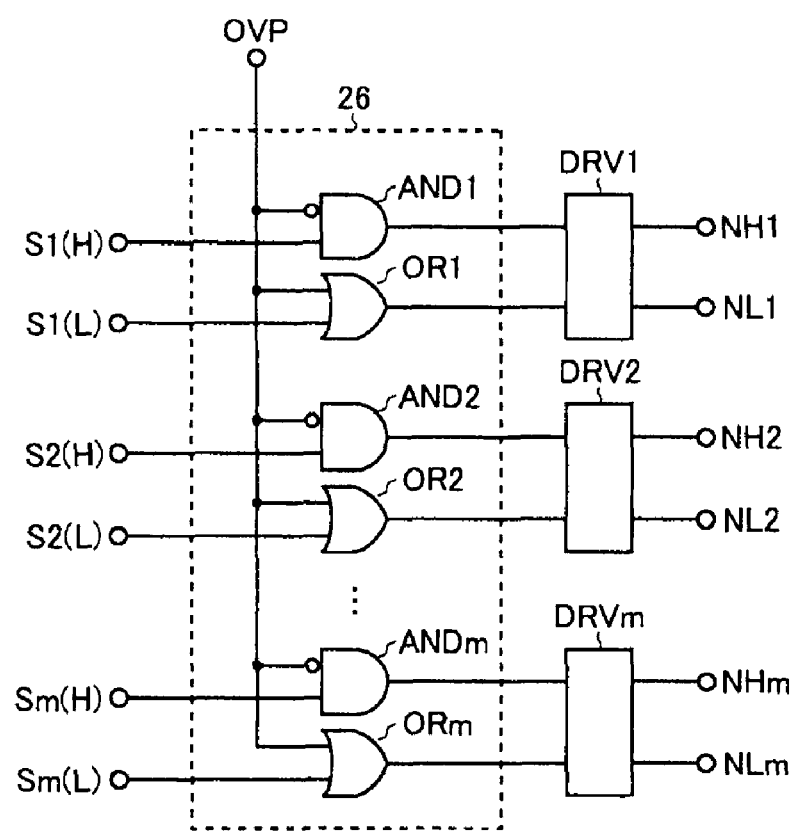
FIG. 8 is a diagram showing a structural example of an overvoltage protection portion 26.

FIG. 8 is a circuit diagram showing a structural example of the overvoltage protection portion 26. As shown in FIG. 8, the overvoltage protection portion 26 having the structural example includes: logical-multiply operation circuits AND1 to ANDm; and logical-sum operation circuits OR1 to ORm.

A logical-multiply operation circuit ANDk (here, $1 \leq k \leq m$) outputs a logical-multiply operation signal of a logic inverting signal of the overvoltage detection signal OVP and the drive signal Sk (H) to the driver DRVk. A logical-sum operation circuit ORk outputs a logical-sum operation signal of the overvoltage detection signal OVP and the drive signal Sk (L) to the driver DRVk.

In the overvoltage protection portion 26 having the above structure, when the overvoltage detection signal OVP is on a low level, the logical-multiply operation circuit ANDk through-ouputs the drive signal Sk (H) to the driver DRVk, while the logical-sum operation circuit ORk through-outputs the drive signal Sk (L) to the driver DRVk. Accordingly, the transistor NHk on the high side and the transistor NLk on the low side which form the output stage of the DC/DC converter circuit 10-k undergo on/off control based on the drive signals Sk (H), Sk (L), respectively.

On the other hand, when the overvoltage detection signal OVP is on a high level, the logical-multiply operation circuit ANDk ouputs the low level to the driver DRVk regardless of the drive signal Sk (H), while the logical-sum operation circuit ORk outputs the high level to the driver DRVk regardless of the drive signal Sk (L). Accordingly, the transistor NHk on the high side which forms the output stage of the DC/DC converter circuit 10-k is forcibly turned off and the transistor NLk on the low side which forms the output stage of the DC/DC converter circuit 10-k is forcibly turned on.

Figure 9:
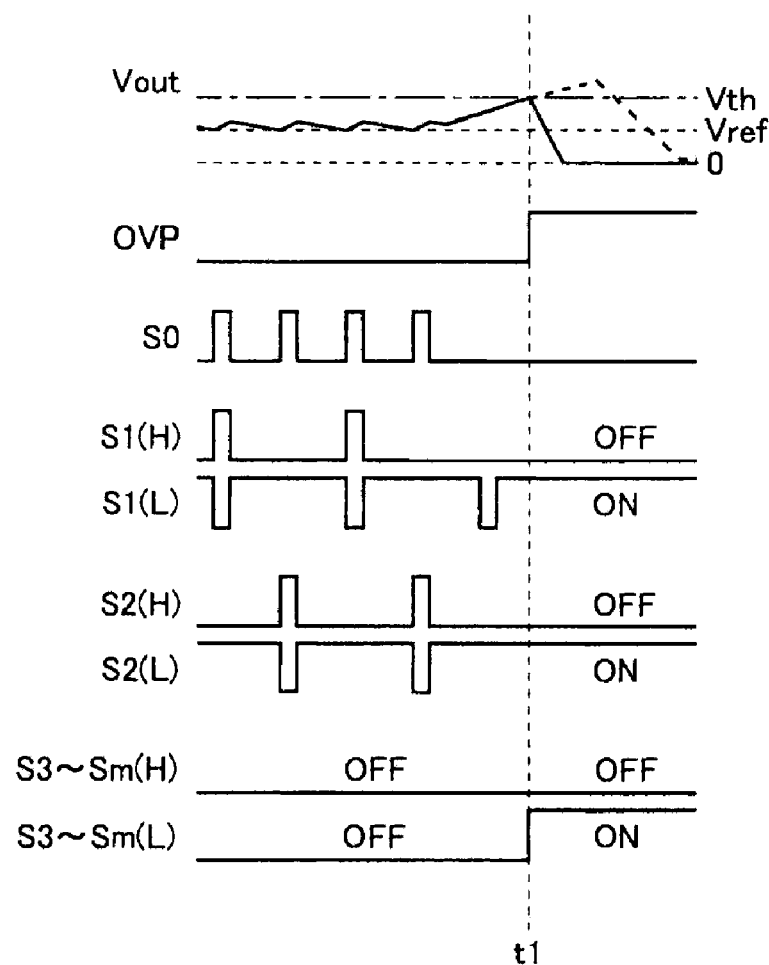
FIG. 9 is a timing chart showing an example of overvoltage protection operation.
Figure 10:
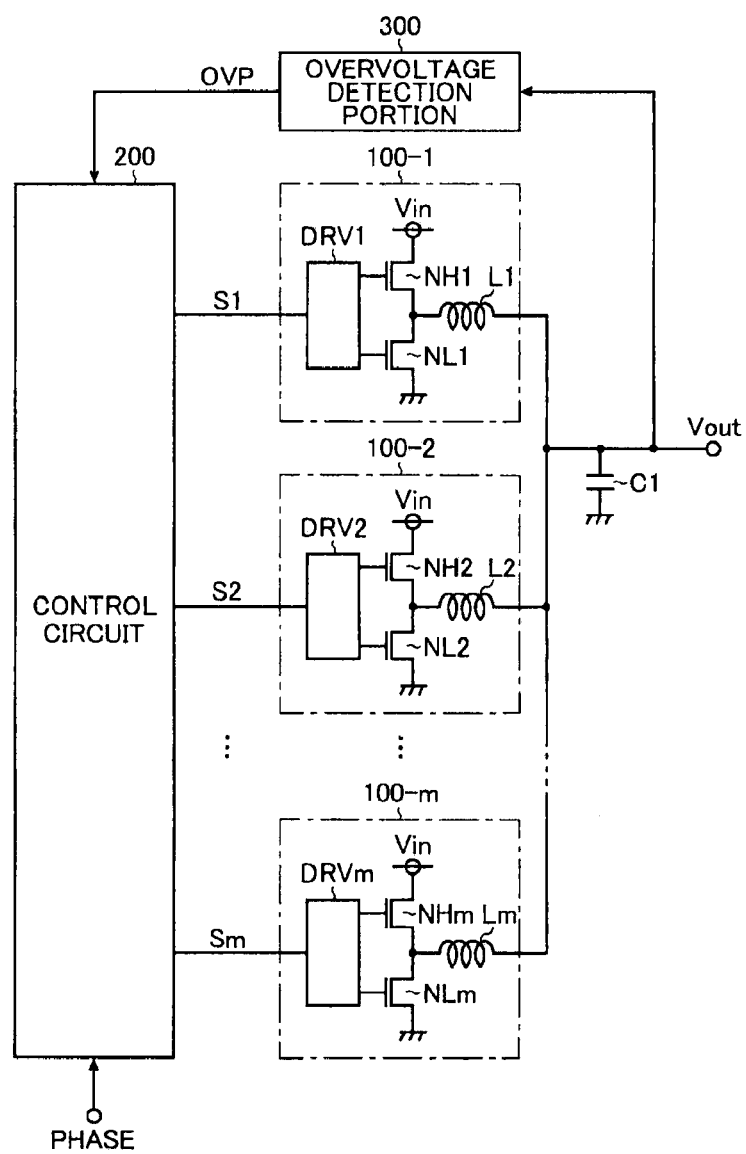
FIG. 10 is a block diagram showing a second conventional example of a multiphase DC/DC converter.
Figure 11:
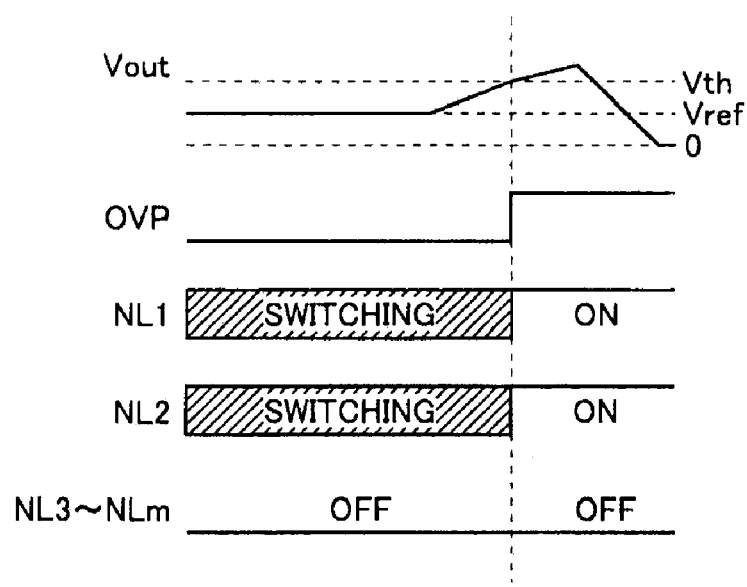
FIG. 11 is a timing chart to explain a problem with the second conventional example.

FIG. 9 is a timing chart showing an example of overvoltage protection operation and represents, in order from the top, behaviors of: the output voltage Vout; the overvoltage detection signal OVP; the pulse signal S0; and the drive signals S1 to Sm. Here, in FIG. 9, it is assumed that the drive-phase number x is set at 2.

When the output voltage Vout gradually drops and becomes lower than the reference voltage Vref, the comparison signal (not shown in FIG. 9) from the comparator 21 rises from the low level to the high level. From the rising time of the comparison signal to the time the predetermined on time elapses, the pulse signal generation portion 22 raises the pulse signal S0 to the high level and then pulls the pulse signal S0 down to the low level. In other words, in the pulse signal generation portion 22, the pulse signal S0 having the predetermined pulse width is generated with the rising edge of the comparison signal being used as the trigger.

The pulse distribution portion 23 successively distributes pulses of the pulse signal S0 to the two systems to generate the drive signals S1 (H, L), S2 (H, L) and outputs the drive signals S1 (H, L), S2 (H, L) to the drivers DRV1, DRV2. Besides, the pulse distribution portion 23 outputs drive signals S3 to Sm (H, L) which are fixed at the low level to the DC/DC converter circuits 10-3 to 10-m other than the DC/DC converter circuits having the drive phase.

Before the time t1, an overvoltage in the output voltage Vout does not occur and the overvoltage detection signal OVP generated by the overvoltage detection circuit 30 is held at the low level; accordingly, the overvoltage protection portion 26 through-outputs the drive signals S1 to Sm to the drivers DRV1 to DRVm. As a result of this, the DC/DC converters 10-1 to 10-2 having the drive phase are driven with the output phases deviated from each other; and the output terminals of the DC/DC converter circuits 10-3 to 10-m other than the DC/DC converter circuits having the drive phase are kept in a high-impedance state.

Before the time t1, every time the output voltage Vout drops to a level at which the output voltage Vout becomes lower than the reference voltage Vref, the above operation is repeated with the drive phases being switched successively; on the other hand, at the time t1, when an overvoltage in the output voltage Vout is detected by the overvoltage detection circuit 30 and the overvoltage detection signal OVP is shifted to the high level, the overvoltage protection portion 26, as described above, forcibly turns off the transistors NH1 to NHm on the high sides which form the output stage of each of all the DC/DC converter circuits 10-1 to 10-m and forcibly turns on the transistors NL1 to NLm on the low sides.

According to such structure, when an overvoltage in the output voltage Vout is detected, it is possible to positively use not only a discharge route via the transistors NL1, NL2 on the low sides included in the DC/DC converters 10-1, 10-2 having the drive phase but also a discharge route via the transistors NL3 to NLm included in the DC/DC converters 10-3 to 10-m other than the DC/DC converters having the drive phase; accordingly, it becomes possible to rapidly pull the output voltage Vout down to the ground potential.

(Third Embodiment)

Figure 12:
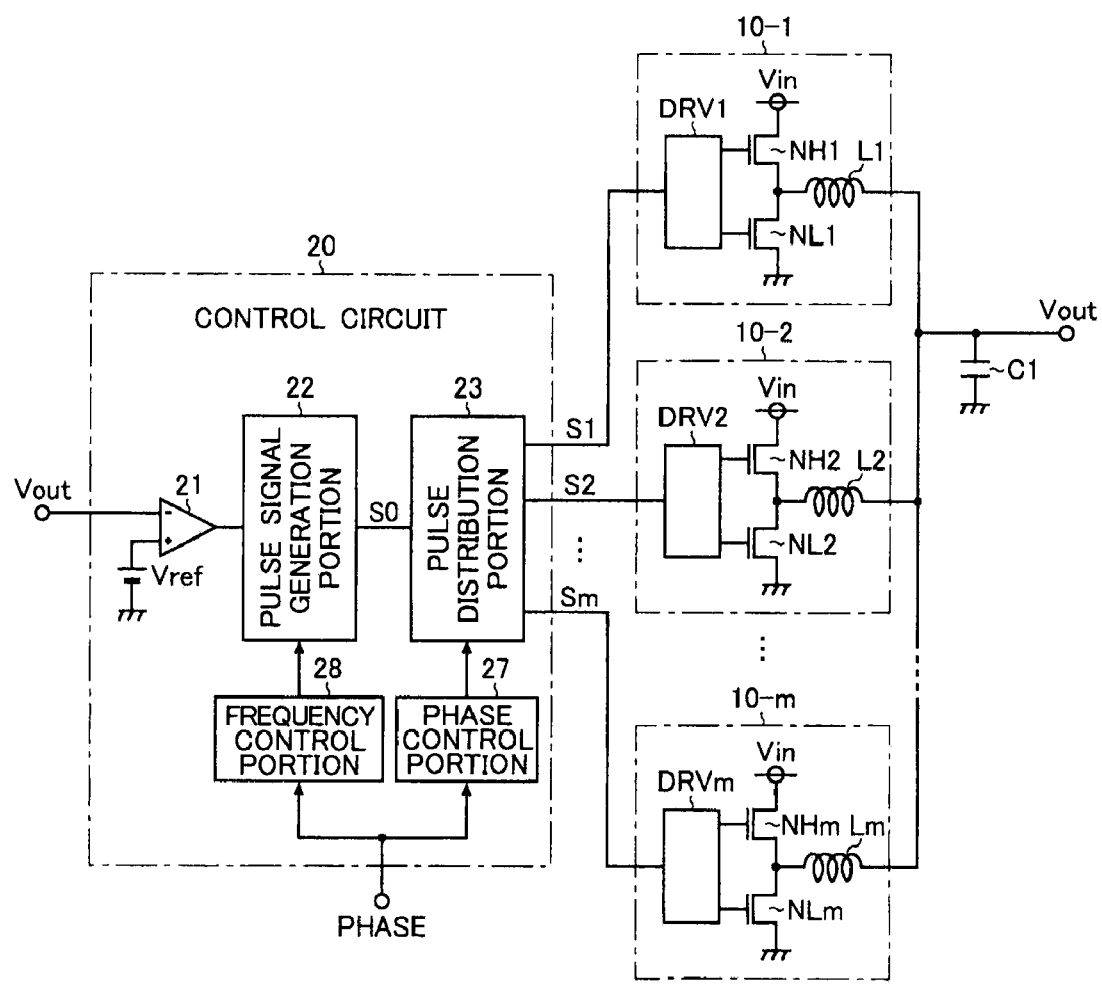
FIG. 12 is a block diagram showing a third embodiment of a multiphase DC/DC converter according to the present invention.

FIG. 12 is a block diagram showing a third embodiment of a multiphase DC/DC converter according to the present invention. As shown in FIG. 12, the multiphase DC/DC converter according to the present embodiment is so structured as to include: the plurality of DC/DC converter circuits 10-1 to 10-m (here, $m \geq 2$) which are connected in parallel with each other; and the control circuit 20 which drives the DC/DC converter circuits 10-1 to 10-m with the output phases of the DC/DC converter circuits 10-1 to 10-m deviated from each other; wherein each output from of the DC/DC converter circuits 10-1 to 10-m is summed up, so that the desired output voltage Vout is generated from the input voltage Vin.

The DC/DC converter circuit 10-k (here, $1 \leq k \leq m$) includes: the N-channel type MOS field effect transistors NHk, NLk; the inductor Lk; and the driver DRVk. The transistors NHk, NLk are connected in series between the application terminal of the input voltage Vin and the ground terminal and their connection nodes are connected to one terminal of the inductor Lk. The other terminal of the inductor Lk is connected to the output terminal of the output voltage Vout. The capacitor C1 is connected between the output terminal of the output voltage Vout and the ground terminal. The gates of the transistors NHk, NLk are each connected to the gate signal output terminal of the driver DRVk.

The driver DRVk generates separately the gate signals of the transistors NHk, NLk based on the drive signal Sk input from the control circuit 20. Specific description of the present embodiment is performed. When the drive signal Sk is on the high level, the driver DRVk generates separately the gate signals of the transistors NHk, NLk to turn on the transistor NHk on the high side and to turn off the transistor NLk on the low side, while when the drive signal Sk is on the low level, the driver DRVk generates separately the gate signals of the transistors NHk, NLk to turn off the transistor NHk on the high side and to turn on the transistor NLk on the low side. Here, the relation between the logic level of the drive signal Sk and the on/off states of the transistors NHk, NLk is only an example and an inverse relation may be used.

On the other hand, the control circuit 20 includes: the comparator 21; the pulse signal generation portion 22; the pulse distribution portion 23; a phase control portion 27; and a frequency control portion 28.

The comparator 21 compares the output voltage Vout (here, a divided voltage of the output voltage Vout is also included) input into the inverting input terminal (−) and the predetermined reference voltage Vref input into the non-inverting terminal (+) and outputs the comparison signal. Specifically, the logic level of the comparison signal goes to the low level when the output voltage Vout is higher than the reference voltage Vref while goes to the high level when the output voltage Vout is lower than the reference voltage Vref.

By using the rising edge of the above comparison signal as the trigger, the pulse signal generation portion 22 generates the pulse signal S0 which has the predetermined pulse width.

The pulse distribution portion 23 successively distributes pulses of the pulse signal S0 to generate the drive signals S1 to Sm.

The phase control portion 27 receives an input of the phase control signal PHASE and arbitrarily sets the drive-phase number of the DC/DC converter circuits 10-1 to 10-m. Specifically, the phase control portion 27 controls the pulse-distribution number of the pulse signal S0 set by the pulse distribution portion 23 in accordance with the drive-phase number of the DC/DC converter circuits 10-1 to 10-m.

The frequency control portion 28 receives an input of the phase control signal PHASE and the larger the drive-phase number of the DC/DC converter circuits 10-1 to 10-m is, the lower the frequency control portion 28 makes the frequencies of the drive signals S1 to Sm, while the smaller the drive-phase number of the DC/DC converter circuits 10-1 to 10-m is, the higher the frequency control portion 28 makes the frequencies of the drive signals S1 to Sm. More specifically, the larger the drive-phase number of the DC/DC converter circuits 10-1 to 10-m is, the larger the frequency control portion 28 makes the pulse width of the drive signal S0 that is set by the pulse signal generation portion 22, while the smaller the drive-phase number of the DC/DC converter circuits 10-1 to 10-m is, the smaller the frequency control portion 28 makes the pulse width of the drive signal S0.

Figure 13:
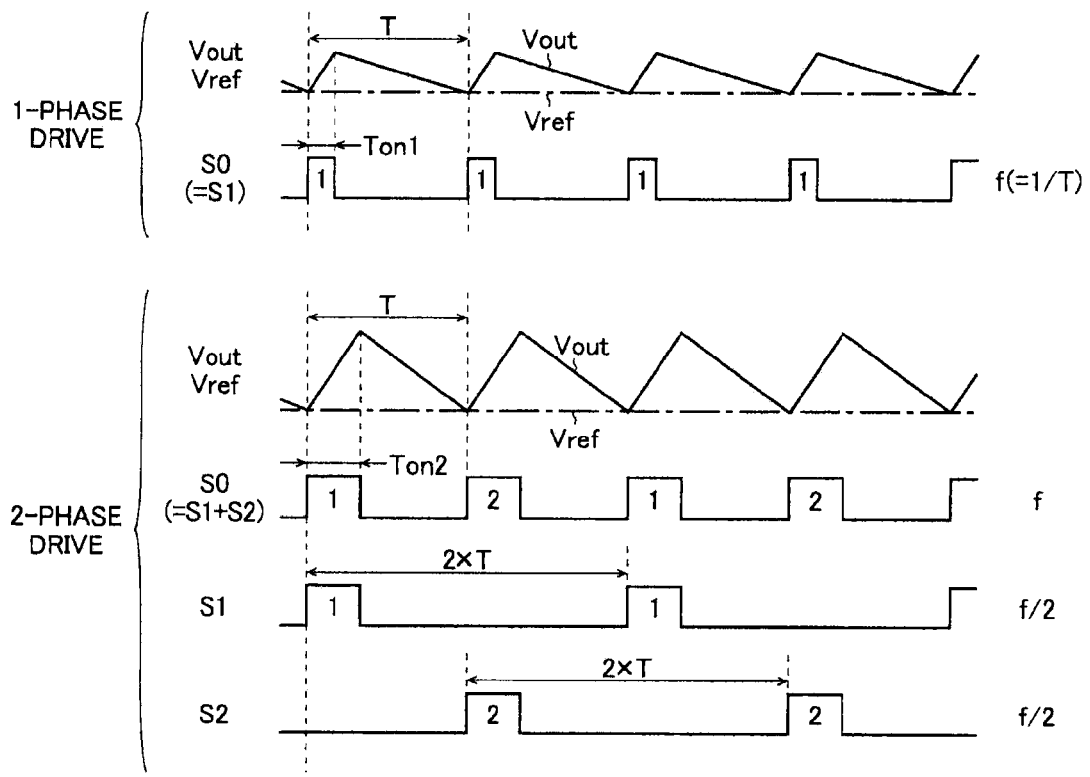
FIG. 13 is a timing chart showing an example of frequency variable control in the third embodiment.
Figure 14:
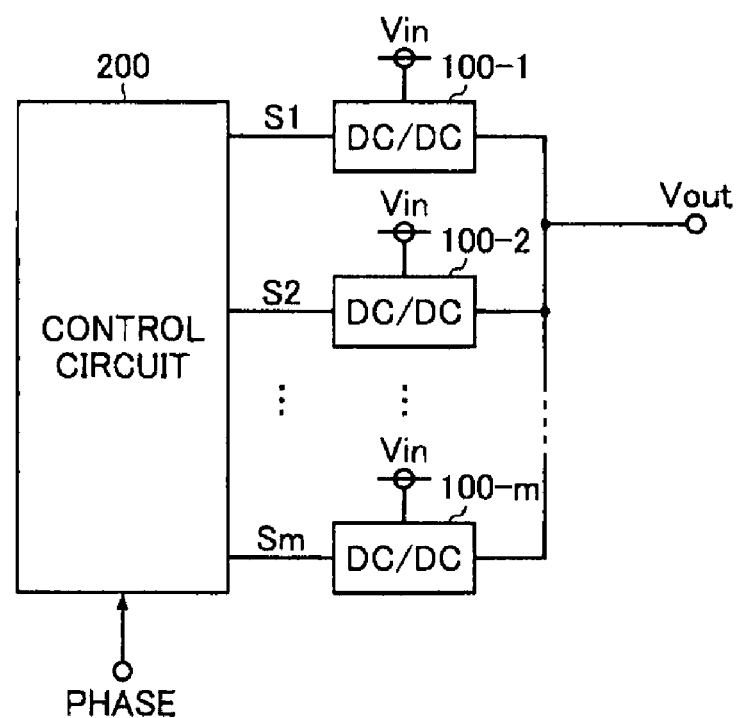
FIG. 14 is a block diagram showing a third conventional example of a multiphase DC/DC converter.
Figure 15:
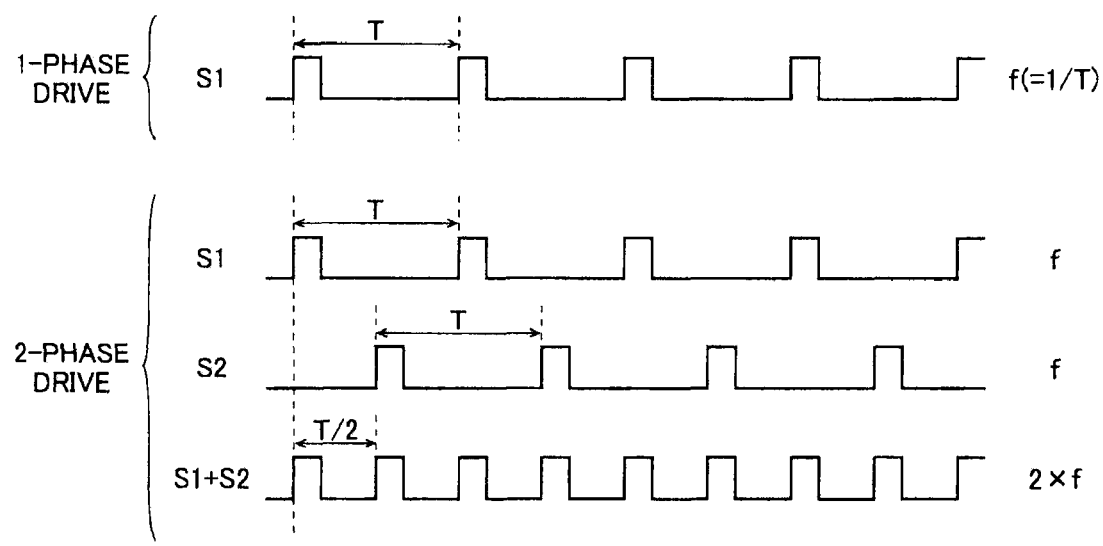
FIG. 15 is a timing chart to explain a problem with the third conventional example.

Next, frequency variable control of the drive signals S1 to Sm in accordance with the drive-phase number of the DC/DC converter circuits 10-1 to 10-m is described in detail with reference to FIG. 13. FIG. 13 is a timing chart showing an example of frequency variable control in the third embodiment. In FIG. 13, for simple description, only a comparison between the frequency variable control operations in the time of 1-phase driving and in the time of 2-phase driving is performed.

First, operation in the 1-phase driving is described with reference to the top stage of FIG. 13. When the output voltage Vout gradually drops and becomes lower than the reference voltage Vref, the comparison signal (not shown in FIG. 13) from the comparator 21 rises from the low level to the high level.

From the rising time of the comparison signal to the time the on period (=Ton 1) set by the frequency control portion 28 elapses, the pulse signal generation portion 22 raises the pulse signal S0 to the high level and then pulls the pulse signal S0 down to the low level. In other words, in the pulse signal generation portion 22, the pulse signal S0 having the predetermined pulse width (=Ton 1) is generated with the rising edge of the comparison signal being used as the trigger.

On the other hand, based on the drive-phase number set from the phase control portion 27, the pulse distribution portion 23 successively distributes pulses of the pulse signal S0 to generate the drive signals S1 to Sm. Because the pulse-distribution number is set at 1 by the phase control portion 27 in the time of the 1-phase driving, the pulse distribution portion 23 performs no pulse distribution process and through-outputs the pulse signal S0 as it is as the drive signal S1 to the DC/DC converter circuit 10-1.

Besides, the pulse distribution portion 23 outputs the drive signals S2 to Sm (not shown in FIG. 13) fixed at the low level to the DC/DC converter circuits 10-2 to 10-m which are not driven. Here, the drivers DRV2 to DRVm recognize that the drive signals S2 to Sm are fixed at the low level without being pulse-driven, and so as to bring each output terminal of the DC/DC converter circuits 10-2 to 10-m into the high-impedance state, the drivers DRV2 to DRVm generate the gate signal of each of the transistors NH2 to NHm on the high sides and the transistors NL2 to NLm on the low sides so as to turn off all the transistors NH2 to NHm on the high sides and the transistors NL2 to NLm on the low sides.

During the time the drive signal S1 is held at the high level for a predetermined on period (=Ton 1), in the DC/DC converter circuit 10-1, the transistor NH1 on the high side is turned on and the transistor NL1 on the low side is turned off; accordingly, the output voltage Vout rises. Thereafter, when the drive signal S1 is returned to the low level, the transistor NH1 on the high side is turned off and the transistor NL1 on the low side is turned on; accordingly, the output voltage Vout gradually drops. And, when the output voltage Vout gradually drops and becomes lower than the reference voltage Vref, the comparison signal from the comparator 21 rises from the low level to the high level and the above operation is repeated.

In the example in FIG. 13, it is assumed that in the time of the 1-phase driving, as a result of setting the pulse width of the pulse signal S0 at Ton 1, the period of the drive signal S1 becomes T and the drive frequency of the entire multiphase DC/DC converter becomes f (=1/T).

Next, operation in the time of the 2-phase driving is described with reference to the bottom stage of FIG. 13. When the output voltage Vout gradually drops and becomes lower than the reference voltage Vref, the comparison signal (not shown in FIG. 13) from the comparator 21 rises from the low level to the high level.

From the rising time of the comparison signal to the time the on period (=Ton 2, here Ton 2>Ton 1) which is set by the frequency control portion 28 elapses, the pulse signal generation portion 22 raises the pulse signal S0 to the high level and then pulls the pulse signal S0 down to the low level. In other words, in the pulse signal generation portion 22, the pulse signal S0 having the predetermined pulse width (=Ton 2) is generated with the rising edge of the comparison signal being used as the trigger. As described above, in the time of the 2-phase driving, the pulse width of the pulse signal S0 is set longer than that in the time of the 1-phase driving by the frequency control portion 28.

On the other hand, based on the drive-phase number set from the phase control portion 27, the pulse distribution portion 23 successively distributes pulses of the pulse signal S0 to generate the drive signals S1 to Sm. Because the pulse-distribution number is set at 2 by the phase control portion 27 in the time of the 2-phase driving, the pulse distribution portion 23, as shown in the bottom stage of FIG. 13, distributes the pulse signal S0 to the two systems to generate the drive signals 51, S2 and outputs the drive signals S1, S2 to the DC/DC converter circuit 10-1, 10-2.

Besides, the pulse distribution portion 23 outputs the drive signals S3 to Sm (not shown in FIG. 13) fixed at the low level to the DC/DC converter circuits 10-3 to 10-m which are not driven. Here, the drivers DRV3 to DRVm recognize that the drive signals S3 to Sm are fixed at the low level without being pulse-driven, and so as to bring each output from the DC/DC converter circuits 10-3 to 10-m into the high-impedance state, the drivers DRV3 to DRVm generate the gate signal of each of the transistors NH3 to NHm on the high sides and the transistors NL3 to NLm on the low sides so as to turn off all the transistors NH3 to NHm on the high side and the transistors NL2 to NLm.

During the time the drive signal S1 is held at the high level for the predetermined on period (=Ton 2), in the DC/DC converter circuit 10-1, the transistor NH1 on the high side is turned on and the transistor NL1 on the low side is turned off; accordingly, the output voltage Vout rises. Here, the output voltage Vout rises to a value higher than that in the time of the 1-phase driving.

Thereafter, when the drive signal S1 is returned to the low level in the DC/DC converter circuit 10-1, the transistor NH1 on the high side is turned off and the transistor NL1 on the low side is turned on; accordingly, the output voltage Vout gradually drops. Here, the output voltage Vout drops more rapidly than that in the time of the 1-phase driving. The reason for this is that both driving signals S1, S2 are held at the low level during the time the output voltage Vout drops to become lower than the reference voltage Vref; accordingly, both transistors NL1, NL2 on the low side which are included in the DC/DC converter circuits 10-1, 10-2 are turned on, so that the number of discharge routes becomes larger than that in the time of the 1-phase driving.

Also thereafter, every time the output voltage Vout drops down to a level to become lower than the reference voltage Vref, as shown in FIG. 13, the above operation is repeated with the DC/DC converter circuits 10-1, 10-2 being switched alternately.

As described above, in the time of the 2-phase driving, during the low-level period of the pulse signal S0, the output voltage Vout drops more rapidly than that in the time of the 1-phase driving; however, by setting the pulse width of the pulse signal S0 longer than that in the time of the 1-phase driving to cancel the increase in the drop speed, it becomes possible to keep the drive frequency (to which the frequency of the pulse signal S0 corresponds) of the entire multiphase DC/DC converter at f (=1/T) which is the same as that in the time of the 1-phase driving.

In the above description, although only the comparison between the frequency variable control operations in the time of the 1-phase driving and in the time of the 2-phase driving is performed, it is true with the time of m-phase driving. Specifically, by employing a structure in which the larger the drive-phase number of the DC/DC converter circuits 10-1 to 10-m is, the lower the frequencies of the drive signals 51 to Sm are, while the smaller the drive-phase number of the DC/DC converter circuits 10-1 to 10-m is, the higher the frequencies of the drive signals S1 to Sm are, it becomes possible to keep the drive frequency of the entire multiphase DC/DC converter at a constant value regardless of the drive-phase number of the DC/DC converter circuits 10-1 to 10-m and becomes possible to easily take measures against noise in a set which incorporates the apparatus.

Hereinafter, the various technical features disclosed above are summed up.

First, the first technical feature disclosed in the present specification is that even when a sharp increase in an output current occurs, it is an object to provide a multiphase DC/DC converter which is able to prevent an output voltage from dropping.

To achieve the object, the control circuit for the multiphase DC/DC converter which has the above first technical feature is a control circuit that drives each of a plurality of DC/DC converter circuits connected in parallel with each other in an on-time fixed mode; the control circuit has is so structured (the 1-1 structure) as to include a load state detection portion that detects a state of a load which receives electric power from the plurality of DC/DC converter circuits and, based on the detection result, switches operations for driving the DC/DC converter circuits with the output phases of the DC/DC converter circuits deviated from each other or aligned with each other.

In the control circuit having the above 1-1 structure, the load state detection portion may have a structure (the 1-2 structure) in which the load state detection portion monitors an output current supplied to the load and drives the DC/DC converter circuits with output phases of the DC/DC converter circuits aligned with each other when the load state detection portion detects a sharp increase in the output current.

Besides, in the control circuit having the above 1-1 structure, the load state detection portion may have a structure (the 1-3 structure) in which the load state detection portion monitors the output voltage supplied to the load and drives the DC/DC converter circuits with the output phases of the DC/DC converter circuits aligned with each other when the load state detection portion detects a sharp decrease in the output voltage.

Besides, in the control circuit having the above 1-1 structure, the load state detection portion may have a structure (the 1-4 structure) in which the load state detection portion monitors a control signal for switching an operation mode of the load and drives the DC/DC converter circuits with the output phases of the DC/DC converter circuits aligned with each other when the load is brought into a heavy-load state.

In addition, the control circuit having any one of the above structures 1-1 to 1-4 may be so structured (the 1-5 structure) as to include: a comparator which compares the output voltage generated by using the plurality of DC/DC converter circuits with a predetermined reference voltage and outputs a comparison signal; a pulse signal generation portion which generates a pulse signal that has a predetermined pulse width by using a rising edge of the comparison signal as a trigger; and a pulse distribution portion which successively distributes pulses of the pulse signal to generate drive signals that are each supplied to the plurality of DC/DC converter circuits; wherein the load state detection portion controls a pulse distribution process in the pulse distribution portion based on a state of the load.

Besides, the multiphase DC/DC converter having the first technical structure is so structured (the 1-6 structure) as to include: a plurality of DC/DC converter circuits connected in parallel with each other; and a control circuit composed of any one of the 1-1 to 1-5 structures that each drives the plurality of DC/DC converter circuits in an on-time fixed mode; wherein each output from of the plurality of DC/DC converter circuits is summed up, so that a desired output voltage is generated from an input voltage.

According to the first technical feature, even when a sharp increase in an output current occurs, it becomes possible to provide a multiphase DC/DC converter which is able to prevent the output voltage from dropping.

Next, the second technical feature disclosed in the present specification is an object to provide a multiphase DC/DC converter which is able to perform suitable overvoltage protection operation regardless of the number of drive phases.

To achieve the object, the control circuit for the multiphase DC/DC converter which has the second technical feature is a control circuit that drives the plurality of DC/DC converter circuits connected in parallel with each other with output phases of the plurality of DC/DC converter circuits deviated from each other; the control circuit is so structured (the 2-1 structure) as to include: a phase control portion which sets the number of drive phases of the plurality of DC/DC converter circuits; and an overvoltage protection portion which turns on a transistor on a low side that forms an output stage of each of all the DC/DC converter circuits regardless of the number of drive phases when an overvoltage in the output voltage generated by using the plurality of DC/DC converter circuits is detected.

Here, the control circuit having the above 2-1 structure may be so structured (the 2-2 structure) as to include: a comparator which compares the output voltage with a predetermined reference voltage and outputs a comparison signal; a pulse signal generation portion which generates a pulse signal that has a predetermined pulse width by using the comparison signal as a trigger; and a pulse distribution portion which successively distributes pulses of the pulse signal to generate drive signals that are each supplied to the plurality of DC/DC converter circuits; wherein the phase control portion controls the number of distributed pulses in the pulse distribution portion in accordance with the number of drive phases of the plurality of DC/DC converter circuits; and the overvoltage protection portion performs a logic gate process of the drive signals in accordance with detection of an overvoltage in the output voltage.

Besides, the multiphase DC/DC converter having the second technical structure is so structured (the 2-3 structure) as to include: a plurality of DC/DC converter circuits connected in parallel with each other; a control circuit which is composed of one of the 2-1 and 2-2 structures and drives the plurality of DC/DC converter circuits with the output phases of the plurality of DC/DC converter circuits deviated from each other; and an overvoltage detection circuit which detects an overvoltage in the output voltage; wherein each output from of the plurality of DC/DC converter is summed up, so that a desired output voltage is generated from an input voltage.

According to the second technical feature, it becomes possible to provide a multiphase DC/DC converter which is able to perform suitable overvoltage protection operation regardless of the number of drive phases.

Next, the third technical feature disclosed in the present specification is an object to provide a multiphase DC/DC converter which is able to keep a drive frequency of the entire DC/DC converter at a constant value regardless of the number of drive phases of the DC/DC converter circuits.

To achieve the object, the control circuit for the multiphase DC/DC converter which has the third technical feature is a control circuit that drives a plurality of DC/DC converter circuits connected in parallel with each other with output phases of the plurality of DC/DC converter circuits deviated from each other; the control circuit is so structured (the 3-1 structure) as to include: a phase control portion which sets the number of drive phases of the plurality of DC/DC converter circuits; and a frequency control portion which variably controls a frequency of a drive signal supplied to the DC/DC converter circuits in accordance with the number of drive phases of the DC/DC converter circuits.

Here, in the control circuit which has the 3-1 structure, the frequency control portion may have a structure (the 3-2 structure) in which the larger the number of drive phases of the DC/DC converter circuits is, the lower the frequency control portion makes the frequency of the drive signal, while the smaller the number of drive phases of the DC/DC converter circuits is, the higher the frequency control portion makes the frequency of the drive signal.

Besides, the control circuit having the above 3-2 structure may be so structured (the 3-3 structure) as to include: a comparator which compares the output voltage with a predetermined reference voltage and outputs a comparison signal; a pulse signal generation portion which generates a pulse signal that has a predetermined pulse width by using the comparison signal as a trigger; and a pulse distribution portion which successively distributes pulses of the pulse signal to generate the drive signal; wherein in accordance with the number of drive phases of the DC/DC converter circuits, the phase control portion controls the number of distributed pulses of the pulse signal set by the pulse distribution portion; and in accordance with the number of drive phases of the DC/DC converter circuits, the frequency control potion controls a pulse width of the pulse signal set by the pulse signal generation portion.

Besides, the multiphase DC/DC converter having the above third technical structure is so structured (the 3-4 structure) as to include: a plurality of DC/DC converter circuits connected in parallel with each other; and a control circuit which is composed of any one of the 3-1 to 3-3 structures and drives the plurality of DC/DC converter circuits with the output phases of the plurality of DC/DC converter circuits deviated from each other; wherein each output from of the plurality of DC/DC converter circuits is summed up, so that a desired output voltage is generated from an input voltage.

According to the third technical feature, it becomes possible to provide a multiphase DC/DC converter which is able to keep a drive frequency of the entire DC/DC converter at a constant value regardless of the number of drive phases of the DC/DC converter circuits.

Here, besides the above embodiments, it is possible to make various modifications to the structure of the present invention without departing from the spirit of the present invention.

For example, in the above embodiments, the description is performed showing the structure as an example which uses the N-channel type MOS field effect transistors NH1 to NHm as the switches on the high sides included in the DC/DC converter circuits 10-1 to 10-$m$. However, the present invention is not limited to this, and P-channel type MOS field effect transistors may be used.

Besides, in the above embodiments, the description is performed showing the structure as an example in which the pulse signal S0 is generated from the comparison signal of the comparator 21 and pulses of the pulse signal S0 are successively distributed to generate the m-system drive signals S1 to Sm. However, the present invention is not limited to this, and a structure may be employed, in which pulses of the comparison signal are successively distributed to generate the m-system comparison signals; and the drive signals S1 to Sm are generated from these m-system comparison signals (in other words, the connection order of the pulse signal generation portion 22 and the pulse distribution portion 23 in FIG. 1 is inverted).

In addition, in the above embodiments, the description is performed showing the structure as an example in which voltage step-down circuits are used as the DC/DC converter circuits 10-1 to 10-*m*. However, the present invention is not limited to this, and voltage step-up circuits may be used.

Besides, as for industrial applicability of the present invention, the present invention is a preferred technology for a multiphase DC/DC converter which is used as a power supply for a CPU and the like, and is useful, for example, as a technology for improving a transient response characteristic at a time of a sharp change in a load, an overvoltage protection technology, and a technology for taking measures against noise.

In the above description, although the best embodiments of the present invention are described, it is apparent to those skilled in the art that it is possible to modify the disclosed invention in various ways and employ various embodiments different from the structures which are specifically described in the above description. Accordingly, the following claims are intended to include any modifications of the present invention in the technical scope without departing from the spirit and technical concept of the present invention.

What is claimed is:

1. A multiphase DC/DC converter comprising:
a plurality of DC/DC converters whose outputs are connected in common to supply electric power to a load;
a load state detection portion which detects a state of the load connected to the plurality of DC/DC converters and outputs a load state detection signal;
a comparator which compares an output voltage generated by the plurality of DC/DC converters and a reference voltage with each other, and outputs a comparison signal;
a pulse signal generation portion which, based on the comparison signal, generates a pulse signal whose on time is fixed; and
a pulse distribution portion which, based on the load state detection signal from the load state detection portion, distributes successively a pulse of the pulse signal as a drive signal for the plurality of DC/DC converters so as to drive the plurality of DC/DC converters such that output phases of the plurality of DC/DC converters are deviated from each other or such that the output phases of the plurality of DC/DC converters are aligned with each other,
wherein an output stage of the pulse distribution portion includes:
a first logical-multiply operation circuit arranged to output a first logical-multiply operation signal of the load state detection signal and a second drive signal,
a second logical-multiply operation circuit arranged to output a second logical-multiply operation signal of the load state detection signal and a first drive signal,
a first logical-sum operation circuit arranged to output a first logical-sum operation signal of the first drive signal and the first logical-multiply operation signal to a first DC/DC convertor, and
a second logical-sum operation circuit arranged to output a second logical-sum operation signal of the second drive signal and the second logical-multiply operation signal to a second DC/DC convertor,
wherein the first and second drive signals are generated by successively distributing pulses of the pulse signal.

2. The multiphase DC/DC converter according to claim 1, wherein the load state detection portion monitors an output current supplied to the load and aligns output phases of the DC/DC converter with each other when the output current increases.

3. The multiphase DC/DC converter according to claim 1, wherein the load state detection portion monitors an output voltage supplied to the load and aligns output phases of the DC/DC converter with each other when the output voltage drops sharply.

4. The multiphase DC/DC converter according to claim 1, wherein the load state detection portion aligns output phases of the DC/DC converter with each other and outputs the output phases when the load state detection portion detects a heavy-load state of the load.

* * * * *